May 22, 1951 R. McLAIN ET AL 2,553,779
HAND LINE PULLEY BRACKET
Filed Jan. 8, 1948
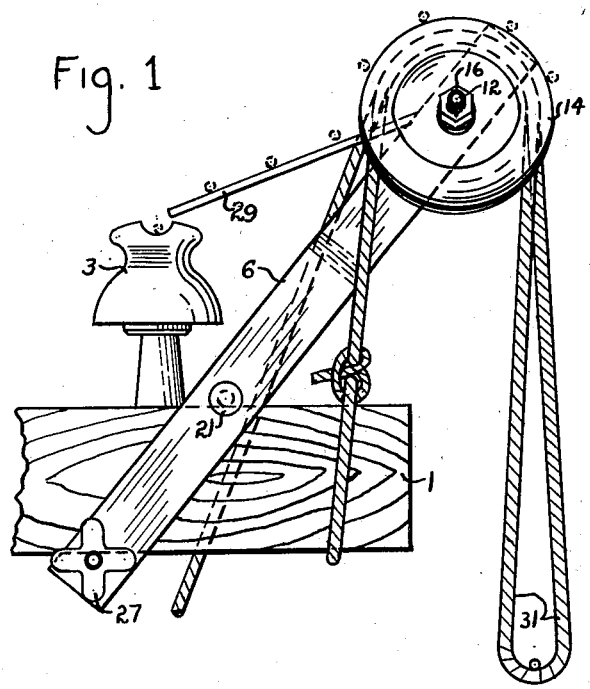
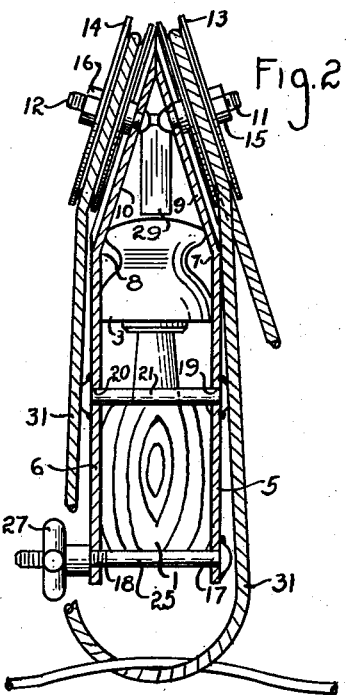
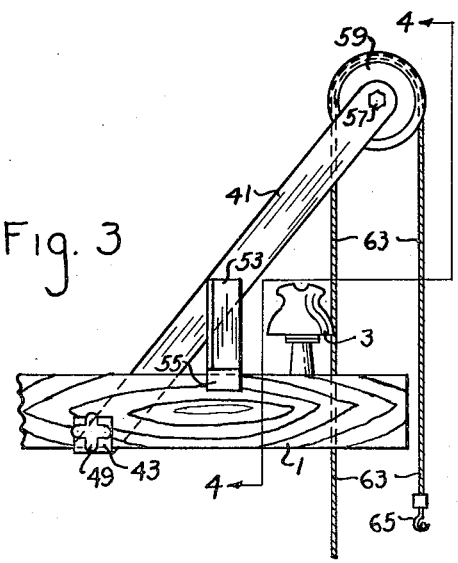
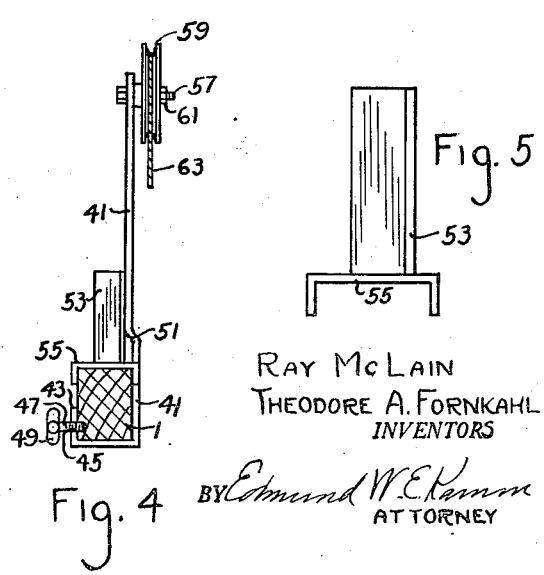
Ray McLain
Theodore A. Fornkahl
INVENTORS
BY Edmund W. E. Kimm
ATTORNEY Patented May 22, 1951

2,553,779

UNITED STATES PATENT OFFICE 2,553,779

HAND LINE PULLEY BRACKET

Ray McLain and Theodore A. Fornkahl,
Cape Girardeau, Mo.

Application January 8, 1948, Serial No. 1,122

6 Claims. (Cl. 175—376)

This invention relates to hand line pulley brackets. More specifically it relates to pulley brackets adapted to be detachably mounted upon the cross-arm of a utility pole to assist a lineman in bringing a wire over the end of the arm and place it in position on the proper insulator. At present it is necessary for the lineman to crawl out on the arm or to swing under it in order to reach beyond the end thereof to swing a wire into position. This is a tedious and often a dangerous task especially in inclement weather.

It is therefore an object of the invention to provide a pulley bracket which can be mounted upon the cross-arm to support a hand line with which the wire or cable can be easily raised and positioned on the insulator.

It is another object of the invention to provide a pulley bracket which can be easily attached to and detached from the cross-arm.

Still another object of the invention is to provide a bracket which is light in weight but strong.

Yet another object of the invention is to provide a pulley bracket which can be clamped to the cross-arm.

A further object of the invention is to provide a cross-arm pulley bracket which has a guide positioned to receive the wire as it leaves the pulley and guides it to the insulator.

Another object of the invention is to provide a bracket which engages the upper and lower edges of the cross-arm.

These and other objects will become apparent from a study of this specification and the drawings which are attached hereto and which form a part hereof and in which:

Figure 1 is a side elevation of one form of hand line pulley bracket having a guide and clamping means.

Figure 2 is an elevation of the apparatus of Figure 1 viewed from the right thereof.

Figure 3 is a side elevation of a modified form of the pulley bracket mounted upon a cross-arm.

Figure 4 is an end elevation of the bracket of Figure 3 viewed from the right thereof.

Figure 5 is an end elevation of the leg of the bracket shown in Figures 3 and 4.

Referring to Figures 1 and 2, the numeral 1 refers to the cross-arm of a utility pole which has an insulator 3 mounted on it near the end. To mount a wire upon this insulator, it is necessary to lift the wire up and around the end of the cross-arm. This is a difficult feat for a lineman who is on the pole. In order to avoid working at arms length, he usually climbs out on the arm or suspends himself from it thus placing himself in a dangerous as well as in an uncomfortable position.

To eliminate such operation we provide a hand line pulley bracket which is formed of two arms 5 and 6 which have their upper ends bent toward each other at 7 and 8 respectively. A hole 9 is formed in the upper end of arm 5 to receive a spindle 11 which is fixed therein and upon which the sheave or pulley 13 is rotatably mounted. A nut 15 holds the pulley on the spindle. A similar hole 10 in arm 6 receives a spindle 12 upon which a pulley 14 is held by means of nut 16.

Holes 17 and 18 are formed in the lower ends of the arms. A spacer 21 is welded at either end in the holes. A bolt 25 is welded in hole 18 and extends freely through hole 17 to receive a hand nut 27.

A guide 29 has one end welded to the converging arms 5 and projects back toward the lower end of the arm but at an angle thereto so that when the bracket is in position on the arm, the guide will project above the insulator which is adjacent the outer end of the arm.

Operation

In operation, the bracket is slipped over the outer end of the cross-arm and moved in until the guide 19 overhangs the first insulator and is permitted to rest with the spacer 21 on the upper edge of the arm. The bracket is then rotated until the bolt 25 contacts the lower side of the arm. Lateral adjustment of the bracket along the arm will position the guide. A turn or two of the hand nut 27 will clamp the bracket on the arm so that it will not work loose or move during operations. The arms are spaced to receive a standard cross-arm freely.

With a line 31 having a hook 33, mounted upon one or the other of the pulleys so that the hook is on the outside run of the line, the device is ready for operation. A ground man will engage a wire with the hook and pull on the free end of the line. This raises the wire which finally passes over the pulley and rests upon the guide 29 where the pole man can easily slide it into place on the insulator and fix it thereon. The sheaves have deep grooves so as to retain the line in spite of any knots or rings which may be in the line.

Where a heavy cable is to be lifted, one end of the line may be tied to the cross-arm. The free end is then passed over the one pulley, down under the cable, up over the second pulley and back to the ground where it can be drawn in by the ground man to lift the cable. As it reaches the pulleys, the cable will be passed over the pulleys onto the guide.

*Modified form*

A modified form of bracket is shown in Figures 3, 4 and 5, which, instead of being mounted upon the cross-arm beyond the last insulator, is mounted on the inside thereof.

The arm 41 has its lower end bent laterally and then upwardly as at 43 to form a hook. The distance between the tab 43 and the arm is substantially equal to the width of a standard arm. The tab is provided with a tapped hole 45 which receives a screw 47 which is operated by a hand wheel 49.

The arm 41 is offset as at 51 and above the offset it has welded to it a depending leg 53 which is preferably of angle iron. The leg has welded to it a bifurcated foot 55 which opens downwardly and is wide enough to receive the top of the cross-arm which it is adapted to span.

The outer end of the arm is perforated to fixedly receive a spindle bolt 57 upon which sheave 59 is rotatably mounted and held in place by a nut 61. A rope 63 fitted with a hook 65 is mounted in the groove of the sheave with the hook end thereof running over the outside face thereof. The screw 47 may be tightened to hold the device in place. The pull of the rope will also tend to hold the bracket in place.

The ground man will engage the hook and wire and will pull the free end of the rope to raise the wire to substantially the level of the insulator. The pole man will then pull the wire into place on the insulator and fix it in place. The bracket can be removed by loosening the screw 47 and tilting the bracket.

While we have disclosed two forms of our invention for purposes of illustration, it is obvious that various changes can be made in the form, construction and arrangement of the parts without departing from the spirit of the invention and we do not therefore, desire to be limited to the exact form shown and described but instead, we desire protection falling fairly within the scope of the appended claims.

What we consider to be new and desire to protect by Letters Patent of the United States of America is:

1. In a support bracket for a cross-arm having an insulator mounted thereon, the combination of an arm, means mounting said arm on the cross-arm to extend above and beyond the end thereof, pulley means rotatably mounted on the end of the arm and a wire guide on the arm and extending away from a point adjacent the pulley means, toward said insulator.

2. In a support bracket, the combination of an arm, sheave means rotatably mounted on the outer end of the arm, means for attaching the other end of the arm to a cross-arm and a guide fixed to the outer end of the arm and extending toward the lower end but diverging therefrom.

3. In a support bracket, the combination of an arm, a pair of supporting studs extending transversely thereof and adapted to engage the upper and lower edges respectively of the cross-arm, two pulleys rotatably mounted on the free end of the arm said pulleys being disposed in outwardly converging planes and with their rims in closely spaced relation.

4. In a support bracket, the combination of a boom formed of two arms bent to converge at one end, two sheaves rotatably mounted one on each converging arm and parallel thereto so as to lie in converging planes with their rims in closely spaced relation, a wire guide fixed to the arm and extending from a point between the sheaves, away from them, means extending transversely of and connecting the arms at the other end said connecting means extending through one arm and a hand wheel thereon.

5. In a support bracket, the combination of a boom formed of two arms bent to converge at one end, two sheaves rotatably mounted one on each converging arm and parallel thereto so as to lie in converging planes with their rims in closely spaced relation, means extending transversely of and connecting the arms at the other end, additional transverse means connecting said arms but spaced from the ends thereof a distance greater than the depth of a cross-arm so that the boom will extend at an acute angle with respect to the cross-arm and wire guide means extending from the pulleys toward the other ends of the arms but diverging therefrom.

6. In a support bracket, the combination of an arm, two sheaves rotatably mounted on the upper end of the arm, means for attaching the bracket to the cross-arm, a guide fixed to the upper end of the arm and extending downwardly along but diverging from the arm, a line tied at one end to the cross-arm, extending over one sheave into a loop, then over the other sheave so that the free end extends toward the ground, said loop being disposed beyond the end of the cross-arm.

RAY McLAIN.
THEODORE A. FORNKAHL.

REFERENCES CITED

The following references are of record in the file of this patent:

UNITED STATES PATENTS

| Number | Name | Date |
|---|---|---|
| 1,050,020 | Herman | Jan. 7, 1913 |
| 1,235,999 | Neeley | Aug. 7, 1917 |
| 1,312,705 | Mitchell | Aug. 12, 1919 |
| 1,358,357 | Bewan | Nov. 9, 1920 |
| 1,995,340 | Buxton | Mar. 26, 1935 |
| 1,996,458 | Clancy | Apr. 2, 1935 |
| 2,213,604 | Lennert | Sept. 3, 1940 |

FOREIGN PATENTS

| Number | Country | Date |
|---|---|---|
| 244,574 | Italy | Dec. 14, 1925 |